(12) United States Patent
Singh

(10) Patent No.: US 11,556,637 B2
(45) Date of Patent: *Jan. 17, 2023

(54) INFORMATION SECURITY SYSTEM AND METHOD FOR ANOMALY AND SECURITY THREAT DETECTION

(71) Applicant: Bank of America Corporation, Charlotte, NC (US)

(72) Inventor: Shailendra Singh, Thane West (IN)

(73) Assignee: Bank of America Corporation, Charlotte, NC (US)

(*) Notice: Subject to any disclaimer, the term of this patent is extended or adjusted under 35 U.S.C. 154(b) by 12 days.

This patent is subject to a terminal disclaimer.

(21) Appl. No.: 17/221,967

(22) Filed: Apr. 5, 2021

(65) Prior Publication Data

US 2022/0318380 A1 Oct. 6, 2022

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 21/55* | (2013.01) |
| *G06F 21/54* | (2013.01) |
| *G06F 21/64* | (2013.01) |
| *G06F 21/57* | (2013.01) |
| *G06F 21/56* | (2013.01) |

(52) U.S. Cl.
CPC ............ *G06F 21/554* (2013.01); *G06F 21/54* (2013.01); *G06F 21/566* (2013.01); *G06F 21/577* (2013.01); *G06F 21/64* (2013.01)

(58) Field of Classification Search
CPC ...... G06F 21/554; G06F 21/54; G06F 21/566; G06F 21/577; G06F 21/64
See application file for complete search history.

(56) References Cited

U.S. PATENT DOCUMENTS

| | | |
|---|---|---|
| 7,021,529 B2 | 4/2006 | Enright et al. |
| 7,594,270 B2 | 9/2009 | Chruch et al. |
| 8,756,684 B2 | 6/2014 | Frantz et al. |

(Continued)

OTHER PUBLICATIONS

Singh, S., "Server-Based Anomaly and Security Threat Detection in Multiple ATMS," U.S. Appl. No. 17/221,870, filed Apr. 5, 2021, 52 pages.

(Continued)

*Primary Examiner* — Trong H Nguyen

(57) ABSTRACT

A system for detecting security threats in a computing device receives a first set of signals from components of the computing device. The first set of signals includes intercommunication electrical signals between the components of the computing device and electromagnetic radiation signals propagated from the components of the computing device. The system extracts baseline features from the first set of signals. The baseline features represent a unique electrical signature of the computing device. The system extracts test features from a second set of signals received from the component of the system. The system determines whether there is a deviation between the test features and baseline features. If the system detects the deviation, the system determines that the computing device is associated with a particular anomaly that makes the computing device vulnerable to unauthorized access.

20 Claims, 5 Drawing Sheets

(56) References Cited

U.S. PATENT DOCUMENTS

| | | |
|---|---|---|
| 8,782,404 B2 | 7/2014 | Lamb |
| 8,825,535 B2 | 9/2014 | Weik, III |
| 8,831,970 B2 | 9/2014 | Weik, III et al. |
| 8,887,286 B2 | 11/2014 | Dupont et al. |
| 9,124,778 B1 | 9/2015 | Crabtree |
| 9,215,244 B2 | 12/2015 | Ayyagari et al. |
| 9,531,702 B2 | 12/2016 | Grim et al. |
| 9,547,766 B2 | 1/2017 | Turgeman et al. |
| 9,552,470 B2 | 1/2017 | Turgeman et al. |
| 9,742,807 B2 | 8/2017 | de los Reyes et al. |
| 9,753,796 B2 | 9/2017 | Mahaffey et al. |
| 9,779,423 B2 | 10/2017 | Turgeman |
| 9,984,538 B2 | 5/2018 | Crist et al. |
| 10,037,421 B2 | 7/2018 | Turgeman et al. |
| 10,055,560 B2 | 8/2018 | Turgeman |
| 10,069,837 B2 | 9/2018 | Turgeman et al. |
| 10,083,439 B2 | 9/2018 | Turgeman et al. |
| 10,091,195 B2 | 10/2018 | Lindemann |
| 10,115,153 B2 | 10/2018 | Zoldi |
| 10,135,841 B2 | 11/2018 | Beam et al. |
| 10,237,070 B2 | 3/2019 | Lindemann |
| 10,237,298 B1 | 3/2019 | Nguyen et al. |
| 10,298,614 B2 | 5/2019 | Turgeman |
| 10,580,005 B2 | 3/2020 | Bruesewitz et al. |
| 10,580,009 B2 | 3/2020 | Snyder et al. |
| 10,621,589 B2 | 4/2020 | Jaffe |
| 10,637,853 B2 | 4/2020 | Lindemann |
| 10,715,543 B2 | 7/2020 | Jakobsson |
| 10,735,456 B2 | 8/2020 | Crabtree et al. |
| 10,769,635 B2 | 9/2020 | Lindemann |
| 10,776,784 B2 | 9/2020 | Buhrmann et al. |
| 10,805,314 B2 | 10/2020 | Jakobsson et al. |
| 2015/0178715 A1 | 6/2015 | Buhrmann et al. |
| 2015/0188949 A1 | 7/2015 | Mahaffey et al. |
| 2015/0317475 A1* | 11/2015 | Aguayo Gonzalez ............ G06F 21/755 726/23 |
| 2016/0057166 A1 | 2/2016 | Chesla |
| 2016/0117502 A1* | 4/2016 | Reed ............ G06F 21/52 726/23 |
| 2016/0197918 A1 | 7/2016 | Turgeman et al. |
| 2016/0342791 A1* | 11/2016 | Aguayo Gonzalez .. G06F 21/32 |
| 2017/0178142 A1 | 6/2017 | Dutt |
| 2017/0193526 A1 | 7/2017 | Turgeman et al. |
| 2018/0082304 A1 | 3/2018 | Summerlin et al. |
| 2018/0349583 A1 | 12/2018 | Turgeman et al. |
| 2019/0020651 A1 | 1/2019 | Soon-Shiong |
| 2019/0164156 A1 | 5/2019 | Lindemann |
| 2019/0243951 A1 | 8/2019 | Hansen et al. |
| 2019/0243971 A1 | 8/2019 | Call et al. |
| 2019/0253404 A1 | 8/2019 | Briceno et al. |
| 2019/0349190 A1 | 11/2019 | Smith et al. |
| 2019/0362356 A1* | 11/2019 | Lacoss-Arnold ............ G06Q 20/4016 |
| 2020/0329066 A1 | 10/2020 | Kirti et al. |
| 2020/0366702 A1 | 11/2020 | Mahaffey et al. |
| 2021/0194921 A1* | 6/2021 | Guajardo Merchan ... G06F 8/71 |

OTHER PUBLICATIONS

Singh, S., "ATM-Based Anomaly and Security Threat Detection," U.S. Appl. No. 17/221,900, filed Apr. 5, 2021, 49 pages.

* cited by examiner

INFORMATION SECURITY SYSTEM AND METHOD FOR ANOMALY AND SECURITY THREAT DETECTION

TECHNICAL FIELD

The present disclosure relates generally to information security, and more specifically to an information security system and method for anomaly and security threat detection.

BACKGROUND

It is challenging to monitor automated teller machines (ATMs) for anomalies and security threats. In current approaches, ATMs are inspected manually for anomalies. However, regularly monitoring ATMs is error-prone. ATMs are predisposed to malicious intrusions that may result in a security breach and, thus, a breach of information stores in the ATMs. Similarly, it is challenging to monitor computer systems for anomalies and security threats. The computer systems are predisposed to malicious intrusions that may result in a security breach, and thus, a breach of information stores in the computer systems. Current information security technologies are not configured to provide a reliable and efficient solution for detecting anomalies and security threats in ATMs or computing devices.

SUMMARY

Current information security technologies are not configured to provide a reliable and efficient solution for detecting anomalies and security threats in ATMs or computing devices. This disclosure recognizes that previous technologies fail to effectively detect anomalies and security threats in ATMs or computing devices. The present disclosure contemplates various systems, methods, and devices to detect anomalies and security threats in ATMs and computing devices. The corresponding description below describes: 1) a server-based anomaly and security threat detection system and method; 2) an ATM-based anomaly and security threat detection system and method; and 3) a computing device-based anomaly and security threat detection system and method.

With respect to a server-based anomaly and security threat detection system, the disclosed system comprises a server operably coupled with multiple ATMs, and is configured to detect anomalies and security threats in one or more ATMs. The disclosed system may perform the following operations for each ATM. The disclosed system establishes baseline features for the ATM. For example, the disclosed system receives a first set of signals from the ATM when the ATM is installed or initiated to operate. The first set of signals may represent a unique and initial electrical signature of electrical components of the ATM. For example, the first set of signals may include electromagnetic (EM) radiation signals, Input/Output (I/O) electrical (e.g., voltage and current) signals, component properties (e.g., component serial number), and a serial number associated with the ATM. Examples of the components may include circuit boards, microprocessors, wire cables, memory components, microchips, cash dispensers, cassettes (for storing bill notes), user interfaces, among others. Each component is designed and fabricated in a particular manner that causes the EM radiation patterns and I/O electrical signals of the component to be unique to that component. The disclosed system extracts baseline features from the first set of signals, e.g., by implementing a machine learning algorithm, signal processing, among others. The baseline features may be represented by a baseline vector that comprises numerical values.

While the ATM is in operation, the disclosed system receives a second set of signals, e.g., EM radiation signals, I/O electrical signals, component properties, and ATM serial number. For example, the disclosed system may be triggered to receive the second set of signals when a user operates the ATM to perform a transaction, e.g., withdraw cash, deposit cash/check, check balance, etc. In another example, the disclosed system may be triggered to receive the second set of signals when a camera of the ATM captures a user approaching the ATM. The disclosed system extracts test features from the second set of signals, e.g., by implementing a machine learning algorithm, signal processing, among others. The test features may represent a test profile of the ATM. The test features may be represented by a test vector that comprises numerical values.

The disclosed system compares the test features with the baseline features. In this operation, the disclosed system compares each numerical value in the baseline feature with its corresponding numerical value in the test vector. The disclosed system determines whether there is a deviation between the test features and the baseline features. For example, the disclosed system determines whether more than a threshold percentage (e.g., 70%, 80%, etc.) of the test features are outside a threshold range (e.g., ±5%, ±10%, etc.) from their corresponding baseline features. If the disclosed system determines that more than the threshold percentage of the test features are outside the threshold range from their corresponding baseline features, the disclosed system determines that there is a deviation between the test features and the baseline features.

In response to detecting the deviation between the test features and the baseline features, the disclosed system determines that the ATM is associated with an anomaly, where the anomaly is associated with a security vulnerability that makes the ATM vulnerable to unauthorized access.

For example, an anomaly may be caused by fluctuations in EM radiation signals indicated in the test features that causes the EM radiations of the components of the ATM to deviate from EM radiations indicated in the baseline features associated with the ATM.

In another example, an anomaly may be caused by tampering with an existing component, e.g., changing wire connections of the component.

In another example, an anomaly may be caused by fluctuations in I/O electrical signals indicated in the test features that causes the I/O electrical signals of the components of the ATM to deviate from I/O electrical signals indicated in the baseline features associated with the ATM.

In another example, an anomaly may be caused by adding a malicious component to the ATM. For example, assume that a bad actor activates a malicious component inside (or adjacent to) the ATM. The malicious component causes interference (e.g., voltage, current, and/or EM radiation signal interferences) against the components of the ATM. This, in turn, causes the EM radiation signals and I/O electrical signals of the components of the ATM to unexpectedly fluctuate and deviate from the EM radiation patterns and I/O electrical signal patterns indicated in the baseline features. As such, adding the malicious component may cause an anomaly in the ATM.

In another example, an anomaly may be caused by adding a new and/or unverified component to the ATM. The disclosed system may determine that a component is new and/or unverified based on a component property of that component, where the component property may include a serial number that uniquely identifies that component. For example, the disclosed system may determine that a component is new and/or unverified if a component property of the component is not found in the baseline features.

The disclosed system may determine that an ATM is associated with a particular anomaly, based on detecting the particular anomaly in another ATM. For example, assume that the disclosed system detects a deviation (e.g., fluctuations in EM radiation signals and/or I/O electrical signals) in a first ATM, and in response, determines that the first ATM is associated with a particular anomaly as a result of adding a malicious component to the first ATM. Also, assume that the disclosed system determines the deviation in a second ATM. Thus, in this example, the disclosed system determines that the second ATM is associated with the particular anomaly, and that the malicious component is added to the second ATM.

With respect to the server-based anomaly and security threat detection system, in one embodiment, a system for detecting anomalies in ATMs comprises a memory and a processor. The memory is operable to store a plurality of baseline features associated with a plurality of ATMs. Each set of baseline features from the plurality of baseline features is associated with a particular ATM. Each set of baseline features indicates a unique electrical signature of electrical components of a particular ATM when the particular ATM is initiated to operate. The unique electrical signature of the electrical components comprises at least one of the expected electrical signal patterns communicated between the electrical components and expected electromagnetic radiation patterns propagated from the electrical components. The plurality of baseline features comprises a first set of baseline features associated with a first ATM and a second set of baseline features associated with a second ATM.

The processor is operably coupled with the memory. The processor receives a first set of signals from the first ATM, where the first set of signals comprises intercommunication signals between electrical components of the first ATM. The processor extracts a first set of test features from the first set of signals, where the first set of test features indicates a test profile of the electrical components of the first ATM while the first ATM is in operation. The processor compares the first set of test features with the first set of baseline features. The processor determines whether there is a deviation between the first set of test features and the first set of baseline features, where determining whether there is the deviation between the first set of test features and the first set of baseline features comprises determining whether more than a threshold percentage of test features from the first set of test features are not within a threshold range from corresponding baseline features from the first set of baseline features. In response to determining the deviation between the first set of test features and the first set of baseline features, the processor determines that the first ATM is associated with a particular anomaly, where determining that the first ATM is associated with the particular anomaly comprises detecting an unexpected fluctuation in the first set of test features that causes the deviation. The particular anomaly is associated with a security vulnerability making the first ATM vulnerable to unauthorized access.

The processor receives a second set of signals from the second ATM, where the second set of signals comprises intercommunication signals between electrical components of the second ATM. The processor extracts a second set of test features from the second set of signals, where the second set of test features indicates a profile of the electrical components of the second ATM while the second ATM is in operation. The processor compares the second set of test features with the second set of baseline features. The processor determines whether the deviation detected in the first ATM is detected in the second ATM, based at least in part comparing the second set of test features with the second set of baseline features. In response to determining that the deviation is detected in the second ATM, the processor determines that the second ATM is associated with the security vulnerability.

With respect to an ATM-based anomaly and security threat detection system, the disclosed system comprises an ATM that is configured to detect anomalies and security threats in the ATM. The process of detecting an anomaly and security threat may be similar to that described above with respect to the server-based anomaly and security threat detection system. For example, the ATM may extract baseline features from a first set of signals, extract test features from a second set of signals, compare the baseline features and test features, determine whether the test features deviate from the baseline features, and in response to determining that the test features deviate from the baseline features, determine that the ATM is associated with an anomaly.

Upon detecting the anomaly, the disclosed system may identify a machine fault code that is associated with the anomaly. For example, the disclosed system may identify the machine fault code by searching through an anomaly-machine fault code mapping table. Upon identifying the machine fault code, the disclosed system may execute a countermeasure action to address the anomaly. For example, the ATM may perform auto-fixing instructions to update the firmware of the components of the ATM. In another example, the ATM may self-reset. In another example, the ATM may trigger an alert message to be displayed on a display screen of the ATM indicating that the machine fault code is detected in the ATM. In another example, the ATM may self-terminate operations of the ATM, or isolate the ATM.

With respect to the ATM-based anomaly and security threat detection system, In one embodiment, a system for detecting security threats in an ATM comprises a memory and a processor. The memory is operable to store a set of baseline features associated with the ATM. The set of baseline features represents a unique electrical signature of electrical components of the ATM when the ATM is initiated to operate. The set of baseline features comprises at least one of the expected electrical signal patterns communicated between the electrical components and expected electromagnetic radiation patterns propagated from the electrical components of the ATM. The processor is operably coupled with the memory. The processor receives a first set of signals from the electrical components of the ATM while the ATM is in operation. The processor extracts a set of test features from the first set of signals, where the set of test features represents a test profile of the electrical components of the ATM while the ATM is in operation. The processor compares the set of test features with the set of baseline features. The processor determines whether there is a deviation between the set of test features and the set of baseline features, where determining whether there is the deviation between the set of test features and the set of baseline features comprises determining whether more than a threshold percentage of test features from the set of test features are not within a threshold range from corresponding baseline features from the set of baseline features. In response to determining the deviation between the set of test features and the set of baseline features, the processor determines that the ATM is associated with a particular anomaly, where determining that the ATM is associated with the particular anomaly comprises detecting an unexpected fluctuation in the set of test features that causes the deviation. The particular anomaly corresponds to a security vulnerability making the ATM vulnerable to unauthorized access.

With respect to a computing device-based anomaly and security detection system, the disclosed system comprises a computing device that is configured to detect anomalies and security threats in the computing device. For example, the computing device may include a personal computer, a desktop computer, a workstation, a server, a laptop, a tablet computer, a mobile phone (such as a smartphone), etc. The process of detecting an anomaly and security threat by the computing device may be similar to that described above with respect to the ATM-based and server-based anomaly and security threat detection systems.

With respect to the computing device-based anomaly and security detection system, in one embodiment, a system for detecting security threats in computing devices comprises a memory and a processor. The memory is operable to store a set of baseline features associated with a computing device. The set of baseline features represents a unique electrical signature of electrical components of the computing device when the computing device is initiated to operate. The set of baseline features comprises at least one of the expected electrical signal patterns communicated between the electrical components and expected electromagnetic radiation patterns propagated from the electrical components of the computing device. The processor is operably coupled with the memory. The processor receives a first set of signals from the electrical components of the computing device while the computing device is in operation. The processor extracts a set of test features from the first set of signals, where the set of test features represents a test profile of the electrical components of the computing device while the computing device is in operation. The processor compares the set of test features with the set of baseline features. The processor determines whether there is a deviation between the set of test features and the set of baseline features, where determining whether there is the deviation between the set of test features and the set of baseline features comprises determining whether more than a threshold percentage of test features from the set of test features are not within a threshold range from corresponding baseline features from the set of baseline features. In response to determining the deviation between the set of test features and the set of baseline features, the processor determines that the computing device is associated with a particular anomaly, where determining that the computing device is associated with the particular anomaly comprises detecting an unexpected fluctuation in the set of test features that causes the deviation. The particular anomaly corresponds to a security vulnerability making the computing device vulnerable to unauthorized access.

The disclosed system provides several practical applications and technical advantages which include: 1) technology that establishes baseline features from signals from wired communications (e.g., I/O electrical signal patterns), wireless communications (e.g., EM radiation patterns), and component properties (e.g., serial numbers) of components of the ATMs and computing devices; 2) technology that detects anomalies and security threats in ATMs and computing devices by learning expected EM radiation patterns, I/O electrical signal patterns, and component properties of components of the ATMs and computing devices; and 3) technology that performs a countermeasure action, in response to detecting an anomaly in a ATM or computing device to address the detected anomaly, where the countermeasure action may include triggering displaying an alert message on the ATM or computing device, resetting the ATM or computing device, executing auto-fixing instructions on the ATM or computing device, e.g., updating firmware of the components, and terminating operations of the ATM or computing device.

As such, the disclosed systems may improve the current information security technologies by detecting anomalies and security threats in ATMs and other computing devices. For example, by analyzing wired and wireless communications of electrical components of the ATMs and other computing devices, the disclosed system learns the unique electrical and EM radiation signal patterns and signature of each ATM and computing device. Thus, the disclosed system detects any unexpected fluctuation in the electrical and/or EM radiation signal of a component and determines a particular anomaly caused by the fluctuation (e.g., caused by a malicious component, a new and/or unverified components, a tampered existing component, etc.).

Accordingly, the disclosed system may be integrated into a practical application of securing data stored in ATMs and other computing devices from unauthorized access, and thus, from data exfiltration, modification, destruction, and the like. This, in turn, provides an additional practical application of securing computer systems and servers that are tasked to oversee operations of the ATMs and other computing devices from unauthorized access as well. The disclosed system may be integrated into an additional practical application of improving underlying operations of the ATMs and other computing devices. For example, the disclosed system may decrease processing, memory, and time resources spent in securing data stored in the ATMs and other computing devices that would otherwise be spent using the existing information security technologies.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
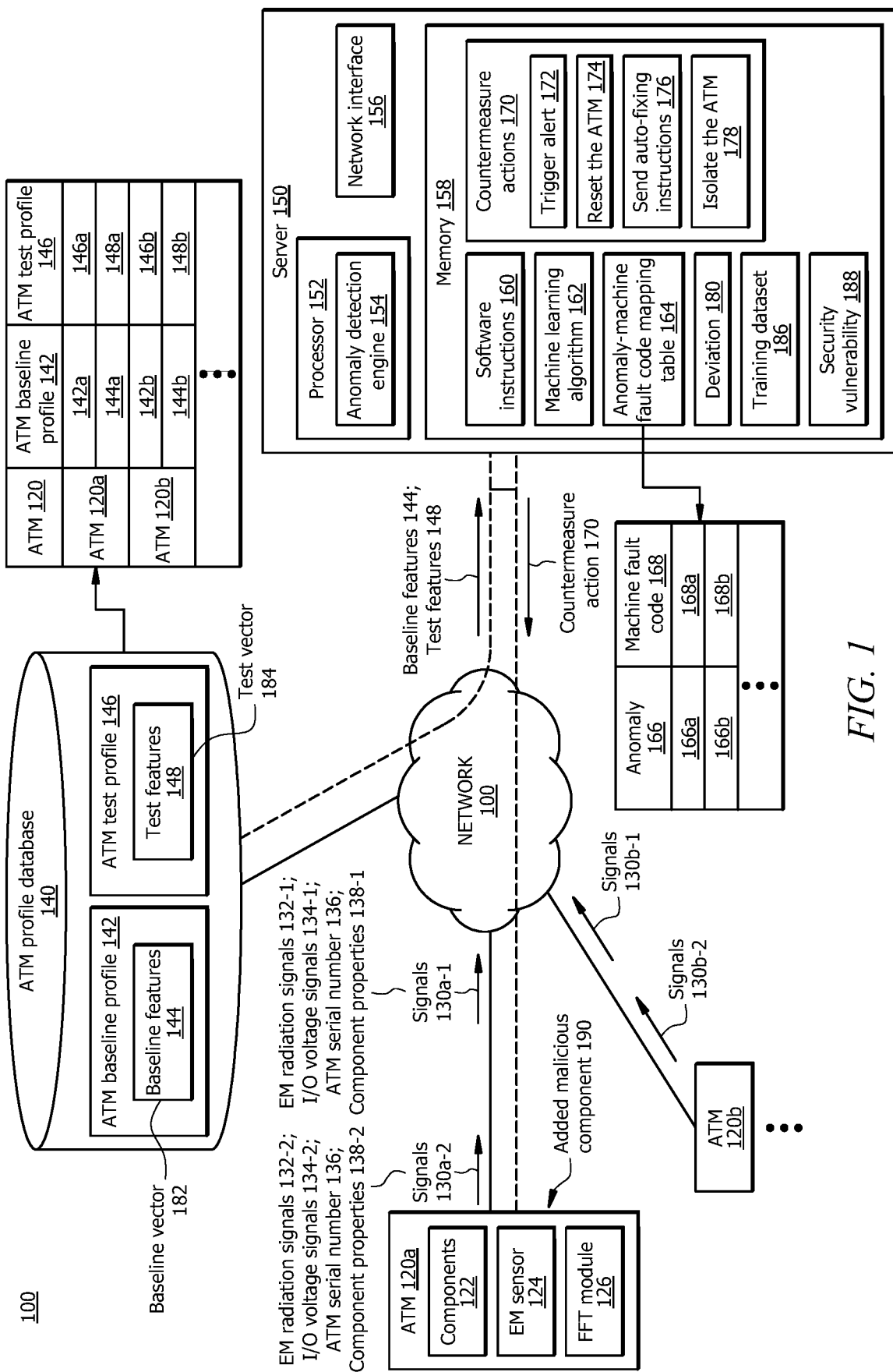
FIG. 1 illustrates an embodiment of a system configured to detect anomalies in ATMs.

As described above, previous technologies fail to provide efficient, reliable, and safe solutions for anomaly and security threat detection in ATMs or other computing devices. This disclosure provides various systems, methods, and devices for anomaly and security threat detection in ATMs and other computing devices. In one embodiment, a server-based anomaly and security threat detection system 100 and a method 200 for detecting anomalies and security threats in ATMs are described in FIGS. 1 and 2, respectively. In one embodiment, an ATM-based anomaly and security threat detection system 300 and a method 400 for detecting anomalies and security threats in an ATM are described in FIGS. 3 and 4, respectively. In one embodiment, a system 300 and method 500 for detecting anomalies and security threats in a computing device are described in FIGS. 3 and 5, respectively.

Example Server-Based Anomaly Detection System

FIG. 1 illustrates one embodiment of a system 100 that is configured to detect anomalies 166 in ATMs 120. In one embodiment, system 100 comprises a server 150 and one or more ATMs 120. In some embodiments, system 100 further comprises an ATM profile database 140 and a network 110. Network 110 enables communications between components of the system 100. Server 150 comprises a processor 152 in signal communication with a memory 158. Memory 158 stores software instructions 160 that when executed by the processor 152 cause the processor 152 to perform one or more functions described herein. For example, when the software instructions 160 are executed, the processor 152 executes an anomaly detection engine 154 to detect anomalies 166 in one or more ATMs 120. In other embodiments, system 100 may not have all of the components listed and/or may have other elements instead of, or in addition to, those listed above.

In general, system 100 (via the anomaly detection engine 154) may perform the following operations for one or more ATMs 120. For example, with respect to ATM 120a, the system 100 (via the anomaly detection engine 154) receives a first set of signals 130a-1 from the ATM 120a. The first set of signals 130a-1 may represent an initial electrical signature (or the ATM baseline profile 142a) of the ATM 120a when the ATM 120a is installed or initiated to operate. For example, the first set of signals 130a-1 comprises electromagnetic (EM) radiation signals 132-1, Input/Output (I/O) electrical signals 134-1, serial number 136, and component properties 138-1 associated with the ATM 120a. The anomaly detection engine 154 extracts a set of baseline features 144a from the first set of signals 130a-1. For example, the set of baseline features 144a is represented by a baseline vector 182 comprising numerical values. While the ATM 120a is in operation, the anomaly detection engine 154 receives a second set of signals 130a-2 from the ATM 120a, where the second set of signals 130a-2 may represent an ATM test profile 146a associated with the ATM 120a. The anomaly detection engine 154 extracts a set of test features 148a from the second set of signals 130a-2. The anomaly detection engine 154 compares the set of baseline features 144a with the set of test features 148a. The anomaly detection engine 154 determines whether there is a deviation 180 between the set of baseline features 144a and the set of test features 148a. In response to determining the deviation 180 between the set of baseline features 144a and the set of test features 148a, the anomaly detection engine 154 determines that the ATM 120a is associated with an anomaly 166, where the anomaly 166 is associated with a security vulnerability 188 that makes the ATM 120a vulnerable to unauthorized access.

System Components

Network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Each ATM 120 (e.g., ATMs 120a and 120b) is generally any automated dispensing device configured to dispense items when users interact with the ATM 120. For example, the ATM 120 may comprise a terminal device for dispensing cash, tickets, scrip, travelers' checks, airline tickets, gaming materials, other items of value, etc. In one embodiment, ATM 120 is an automated teller machine that allows users to withdraw cash, check balances, make deposits interactively using, for example, a magnetically encoded card, a check, etc., among other services that the ATM 120 provides.

In the illustrated embodiment, an ATM 120 comprises a plurality of components 122, an electromagnetic (EM) sensor 124, and Fast Fourier Transform (FFT) module 126. The ATM 120 may be configured as shown or in any other configurations.

Components 122 are generally electrical components of an ATM 120. For example, components 122 may include circuit boards, wire cables, memory components, microchips, cash dispenser, cassettes (for storing bill notes), user interfaces (e.g., display screen, keypads, etc.), among any other component that an ATM 120 may include. Each component 122 is associated with a component property 138. The component property 138 associated with a particular component 122 indicates a serial number that uniquely identifies the particular component 122. Each component 122 is fabricated by a particular vendor or manufacturer. Each vendor fabricates its components 122 in a particular manner. Different ways of fabricating components 122 result in different electrical signal ranges and electromagnetic radiation patterns. As such, each component 122 is associated with a unique electrical signature, including EM signal radiations 132 and I/O voltage signal ranges 134. The anomaly detection engine 154 uses this information to determine whether a component 122 is verified based on its unique electrical signal signature. The anomaly detection engine 154 further uses this information to detect any unexpected fluctuations in the EM signal radiations 132 and I/O voltage signal ranges 134. These processes are described in detail further below.

The EM sensor 124 is generally a sensor that is configured to detect EM radiation signals 132 propagated from the electrical components 122. The EM sensor 124 may be configured to detect a broad range of frequencies, e.g., from 100 KHz to 5 MHz, or any frequency that a component 122 may propagate. When a first electrical component 122 transmits a signal to second electrical component 122, the first and the second components 122 propagate an EM wave signal 132 in a three-dimensional space. The EM sensor 124 is used to capture such EM wave radiation signals 132. The EM sensor 124 is further configured to capture other wireless signals, e.g., signals in WIFI bandwidth, Bluetooth bandwidth, etc.

FFT module 126 is generally a software and/or hardware module, and is configured to demodulate the EM radiation signals 132. The FFT module 126 may include an analog to digital converter module that is configured to convert analog EM radiation signals 132 to digital EM radiation signals 132. For example, assume that the ATM 120a comprises ten components 122. While the ATM 120a is in operation, for example, when a user is operating the ATM 120a to perform a transaction, components 122 begin to process the transaction. For example, when the user is operating the ATM 120a to perform a transaction, a first component 122 may display a menu on a display screen of the ATM 120a, a second component 122 may process a request of the user, etc. These activities of the components 122 result in propagating EM radiation signals 132-2 by the components 122 and generating I/O voltage signal 134-2 between the components 122.

For example, assume that there are ten components 122 in ATM 120a. Thus, the EM radiations 132-2 is a modulated signal that includes ten frequency components (e.g., 120 KHs, 130 KHz, . . . , 200 KHz), each associated with a certain component 122. The EM sensor 124 captures these EM radiations 132-2, and feeds them to the FFT module 126. The FFT module 126 demodulates the EM radiations 132-2, and determines each frequency component associated with each component 122. For example, the FFT module 126 determines that a first frequency component (e.g., 120 KHz) is associated with a first component 122, a second frequency component (e.g., 130 KHz) is associated with a second component 122, and so on. The anomaly detection engine 154 uses this information to determine whether a new component 122 is added to the ATM 120a, detect an unverified or malicious component 190 whose EM radiation 132-2 differs from an EM radiation signal 132-1 indicated in the baseline feature 144, etc. For example, if the anomaly detection engine 154 detects eleven frequency components in the EM radiations 132-2, the anomaly detection engine 154 determines that there is a new component 190 added to the ATM 120a. In another example, if the anomaly detection engine 154 detects an unexpected fluctuation in the EM radiations 132-2, the anomaly detection engine 154 may determine that an unverified and/or malicious component 190 is replaced with an existing component 122. These processes are described in detail further below.

ATM profile database 140 generally comprises any storage architecture. Examples of the ATM profile database 140, include, but are not limited to, a network-attached storage cloud, a storage area network, a storage assembly directly (or indirectly) coupled to one or more components of the system 100. The ATM profile database 140 stores ATM baseline profiles 142 and ATM test profiles 146.

Each ATM baseline profile 142 is associated with a particular ATM 120. For example, ATM baseline profile 142a is associated with the ATM 120a, ATM baseline profile 142b is associated with the ATM 120b, and so on. The ATM baseline profile 142 represents an initial electronic signature of components 122 of an ATM 120 when the ATM 120 is installed and initiated to operate. The ATM baseline profile 142 stores baseline features 144 that are represented by a baseline vector 182 comprising numerical values representing the initial electronic signature of component 122 of the ATM 120. The anomaly detection engine 154 extracts the baseline features 144a from the set of signals 130a-1, and stores them in the ATM baseline profile 142. This process is described further below. The baseline features 144 associated with an ATM 120 may be updated based on changes made to the electrical components 122 of the ATM 120 in an updating or certifying process of the ATM 120 by authorized personnel.

Each ATM test profile 146 is associated with a particular ATM 120. For example, the ATM test profile 146a is associated with the ATM 120a, ATM test profile 146b is associated with the ATM 120b, and so on. The ATM test profile 146 stores test features 148 that are represented by a test vector 184 comprising numerical values representing the electrical signature of components 122 of an ATM 120, when the ATM 120 is in operation, e.g., when a user operates the ATM 120 to perform a transaction, such as withdraw cash, deposit cash/check, check account balance, etc. The anomaly detection engine 154 extracts the test features 148a from the set of signals 130a-2, and stores them in the ATM test profile 146. This process is described further below.

Server

Server 150 is generally a server or any other device configured to process data and communicate with computing devices, ATMs 120, and databases (e.g., ATM profile database 140), systems, domains, etc., via the network 110. In one example, server 150 may be a backend server associated with ATMs 120, and is generally configured to oversee operations of the ATMs 120 and processor 152 as described further below. For example, the server 150 is configured to oversee detecting anomalies 166 in ATMs 120, and performing countermeasure actions 170 to address the detected anomalies 166.

Processor 152 comprises one or more processors operably coupled to the memory 158. The processor 152 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 152 may be a programmable logic device, a microcontroller, a microprocessor, or any suitable combination of the preceding. The one or more processors are configured to process data and may be implemented in hardware or software. For example, the processor 152 may be 8-bit, 16-bit, 32-bit, 64-bit, or of any other suitable architecture. The processor 152 may include an arithmetic logic unit (ALU) for performing arithmetic and logic operations, processor 152 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 160) to implement the anomaly detection engine 154. In this way, processor 152 may be a special-purpose computer designed to implement the functions disclosed herein. In an embodiment, the processor 152 is implemented using logic units, FPGAs, ASICs, DSPs, or any other suitable hardware. The processor 152 is configured to operate as described in FIGS. 1 and 2. For example, the processor 152 may be configured to perform one or more steps of method 200 as described in FIG. 2.

Network interface 156 is configured to enable wired and/or wireless communications (e.g., via network 110). The network interface 156 is configured to communicate data between the server 150 and other devices, ATMs 120, databases (e.g., ATM profile database 140), systems, and domains. For example, the network interface 156 may comprise a WIFI interface, a local area network (LAN) interface, a wide area network (WAN) interface, a modem, a switch, or a router. The processor 152 is configured to send and receive data using the network interface 156. The network interface 156 may be configured to use any suitable type of communication protocol as would be appreciated by one of ordinary skill in the art.

Memory 158 may be volatile or non-volatile and may comprise a read-only memory (ROM), random-access memory (RAM), ternary content-addressable memory (TCAM), dynamic random-access memory (DRAM), and static random-access memory (SRAM). Memory 158 may be implemented using one or more disks, tape drives, solid-state drives, and/or the like. Memory 158 is operable to store the software instructions 160, machine learning algorithm 162, anomaly-machine fault code mapping table 164, countermeasure actions 170, deviation 180, training dataset 186, security vulnerability 188, and/or any other data or instructions. The software instructions 160 may comprise any suitable set of instructions, logic, rules, or code operable to execute the processor 152.

Anomaly Detection Engine

Anomaly detection engine 154 may be implemented by the processor 152 executing software instructions 160, and is generally configured to detect anomalies 166 in ATMs 120. For example, to detect whether the ATM 120*a* is associated with an anomaly 166, the anomaly detection engine 154 extracts baseline features 144*a* from the first set of signals 130*a*-1, extracts test features 148*a* from the second set of signals 130*a*-2, compares the baseline features 144*a* with test features 148*a*, determines whether the test features 148*a* deviate from the baseline features 144*a*, and in response to determining that the test features 148*a* deviate from the baseline features 144*a*, determines that the ATM 120*a* is associated with an anomaly 166. These operations are described further below in conjunction with an operational flow of system 100.

The anomaly detection engine 154 may be implemented using a machine learning algorithm 162, such as support vector machine, neural network, random forest, k-means clustering, etc. For example, the machine learning algorithm 162 may be implemented by a plurality of neural network (NN) layers, Convolutional NN (CNN) layers, Long-Short-Term-Memory (LSTM) layers, Bi-directional LSTM layers, Recurrent NN (RNN) layers, and the like. In another example, the machine learning algorithm 162 may be implemented by a Natural Language Processing (NLP). In another example, the machine learning algorithm 162 may be implemented by analog signal processing, digital signal processing, signal quantization, signal frequency sampling, among others.

Thus, the anomaly detection engine 154, using the machine learning algorithm 162, may be configured to process the first set of signals 130*a*-1, and extract baseline features 144*a* from the first set of signals 130*a*-1. In this operation, the anomaly detection engine 154 feeds the first set of signals 130*a*-1 to the machine learning algorithm 162. The output of this operation is a baseline vector 182 that comprises numerical values that represent baseline features 144*a*. Similarly, the anomaly detection engine 154 may extract test features 148*a* from the second set of signals 130*a*-2 by feeding the second set of signals 130*a*-2 to the machine learning algorithm 162. The output of this operation is a test vector 148 that comprises numerical values that represent the test features 148*a*. The anomaly detection engine 154 may perform a similar operation for each ATM 120 and extract their baseline features 144 and test features 148.

Operational Flow

Extracting Baseline Features and Test Features for Each ATM

The operational flow of system 100 begins when the anomaly detection engine 154 receives a set of signals 130 from each ATM 120. For example, the anomaly detection engine 154 may receive signals 130*a*-1 from ATM 120*a*, and signals 130*b*-1 from ATM 120*b*. The anomaly detection engine 154 may perform the following operations for each ATM 120. For example, with respect to ATM 120*a*, the anomaly detection engine 154 extracts baseline features 144*a* from the set of signals 130*a*-1, e.g., by implementing the machine learning algorithm 162 similar to that described above.

While the ATM 120*a* is in operation, the anomaly detection engine 154 receives a second set of signals 130*a*-2 from the ATM 120*a*. For example, the anomaly detection engine 154 may receive the second set of signals 130*a*-2 when a user operates the ATM 120*a* to perform a transaction. In another example, the anomaly detection engine 154 may receive the second set of signals 130*a*-2 continuously or periodically, e.g., every minute, every few minutes, every hour, or any other suitable interval. The anomaly detection engine 154 extracts test features 148*a* from the second set of signals 130*a*-2, e.g., by implementing the machine learning algorithm 162 similar to that described above. Similarly, with respect to ATM 120*b*, by implementing the machine learning algorithm 162, the anomaly detection engine extracts baseline features 144*b* from the signals 130*b*-1, and test features 148*b* from the signals 130*b*-2.

Determining Whether an ATM is Associated with an Anomaly

To determine whether an ATM 120 is associated with an anomaly 166, the anomaly detection engine 154 compares the baseline features 144 with test features 148 associated with the ATM 120. In this operation, the anomaly detection engine 154 compares each baseline feature 144 with its corresponding test feature 148 associated with the ATM 120. Each baseline feature 144 is represented by a numerical value in the baseline vector 182, and each test feature 148 is represented by a numerical value in the test vector 184. In other words, in this operation, the anomaly detection engine 154 compares each numerical value in the baseline vector 182 with a corresponding numerical value in the test vector 184 associated with the ATM 120.

The anomaly detection engine 154 determines a difference between each numerical value in the baseline vector 182 and the corresponding numerical value in the test vector 184. The anomaly detection engine 154 determines whether each numerical value in the baseline vector 182 is within a threshold percentage (e.g., 70%, 80%, etc.) from its corresponding numerical value in the test vector 184. If a numerical value (representing a baseline feature 144) in the baseline vector 182 is within the threshold range ((e.g., ±5%, ±10%, etc.) from its corresponding numerical value (representing a test feature 148) in the test vector 184, the anomaly detection engine 154 determines that test feature 148 corresponds to its corresponding baseline feature 144. Otherwise, the anomaly detection engine 154 determines that the test feature 148 deviates from its corresponding baseline feature 144, i.e., there is a deviation 180 between the test feature 148 and its corresponding baseline feature 144.

The anomaly detection engine 154 determines whether more than a threshold percentage of the test features 148 (e.g., above 80%, 85%, or any suitable threshold percentage) deviate from their corresponding baseline features 144. If the anomaly detection engine 154 determines that more than the threshold percentage of the test features 148 deviate from their corresponding baseline features 144, the anomaly detection engine 154 determines that the ATM 120 is associated with an anomaly 166. Otherwise, the anomaly detection engine 154 determines that the baseline features 144 correspond to the test features 148.

The anomaly detection engine 154 may perform the above operations for each ATM 120. In this manner, the anomaly detection engine 154 may determine one or more anomalies 166 in one or more ATMs 120.

For example, an anomaly 166 may be caused by fluctuations in EM radiation signals 132 and/or fluctuations in I/O voltage (and/or current) signals 134. In another example, an anomaly 166 may be caused by adding a malicious component 190 to the ATM 120. In another example, an anomaly 166 may be caused by tampering with an existing component 122, such as disconnecting a wire, changing a wire connection, etc. In another example, an anomaly 166 may be caused by EM radiation and/or frequency signal interference from an external component 190 that is activated adjacent to the ATM 120, such that the EM radiation and/or frequency signal interference causes fluctuations in the EM radiation signals 132 and/or fluctuations in I/O voltage (and/or current) signals 134 of the components 122 inside the ATM 120.

In another example, an anomaly 166 may be caused by a new and/or unverified component 122. The anomaly detection engine 154 may determine that a component 122 is new and/or unverified based on a component property 138 of the component 122, where the component property 138 may include a serial number that uniquely identifies the component 122. For example, the anomaly detection engine 154 may determine that a component 122 is new and/or unverified if a component property 138 associated with the component 122 differs from component properties 138 indicated in the baseline features 144. In another example, the anomaly detection engine 154 may determine that a component 122 is new and/or unverified, if, based on a component property 138 associated with the component 122, the anomaly detection engine 154 determines that a vendor of the component 122 is not indicated in the baseline features 144.

An operator may confirm, revise, or override the determination the anomaly detection engine 154 with respect to detecting the anomaly 166 in the ATM 120. For example, an operator may access the server 150, e.g., using its user interfaces, and review the baseline features 144, test features 148, deviation 180, and the anomaly 166. The operator may provide feedback to the anomaly detection engine 154 regarding detecting the anomaly 166. By analyzing the feedback from the operator, baseline features 144, test features 148, and deviation 180, the anomaly detection engine 154 learns correlations between different examples of anomalies 166 and deviations 180 between the baseline features 144 and test features 148. For example, assume that a particular anomaly 166a is caused when a bad actor used a malicious component 190 adjacent to the ATM 120a to launch a cyberattack on the ATM 120a. The anomaly detection engine 154 detects the deviation 180 between the baseline features 144 and test features 148, determines that the deviation 180 is associated with the particular anomaly 166a, and that the malicious component 190 caused the anomaly 166a. If the anomaly detection engine 154 detects the particular anomaly 166a in another ATM 120 (e.g., ATM 120b), the anomaly detection engine 154 determines that the particular anomaly 166a is caused by the malicious component 190. This process is described in more detail further below.

Generating an Anomaly-Machine Fault Code Mapping Table

Once the anomaly detection engine 154 determines that an ATM 120 is associated with an anomaly 166, the anomaly detection engine 154 may identify a particular machine fault code 168 that is associated with the anomaly 166. The machine fault code 168 may represent a plurality of fault or error codes that each is associated with a unique number, e.g., error 1000001, etc. For example, a first machine fault code 168a may indicate that a component 122 is not responsive (or voltage signals received from the component 122 are not within the expected range indicated in the ATM baseline profile 142). In another example, a second machine fault code 168b may indicate that a vault door switch that provides an entrance to the interior of an ATM 120 is open.

Upon detecting a particular anomaly 166 in an ATM 120, the anomaly detection engine 154 identifies a particular machine fault code 168 that is associated with or identifies the particular anomaly 166. To this end, the anomaly detection engine 154 generates the anomaly-machine fault code mapping table 164.

In one embodiment, the anomaly detection engine 154 may generate the anomaly-machine fault code mapping table 164 by using a plurality of detected anomalies 166 in ATMs 120 as a training dataset 186 that comprises the detected anomalies 166, each labeled with a particular machine fault code 168 as determined or confirmed by an operator. The anomaly detection engine 154 uses the training dataset 186 to learn associations and relationships between each detected anomaly 166 and a corresponding machine fault code 168 that represents an anomaly 166 when the anomaly 166 occurs in the ATM 120.

In generating the anomaly-machine fault code mapping table 164, the anomaly detection engine 154 may implement a supervised and/or a semi-supervised machine learning algorithm 162. For example, upon detecting an anomaly 166a in an ATM 120, an operator may identify a first machine fault code 168a that represents the anomaly 166a. As such, the anomaly detection engine 154 labels the anomaly 166a with the first machine fault code 168a, and stores them in the anomaly-machine fault code mapping table 164. Similarly, upon detecting an anomaly 166b in an ATM 120, an operator may identify a second machine fault code 168b that represents the anomaly 166b. The anomaly detection engine 154 labels the anomaly 166b with the second machine fault code 168b, and stores them in the anomaly-machine fault code mapping table 164. As such, other anomalies 166 labeled with their corresponding machine fault code 168 may be added to the anomaly-machine fault code mapping table 164.

In one embodiment, once the anomaly detection engine 154 learns the associations and relationships between the anomalies 166 and machine fault code 168 (e.g., using the training dataset 186 and anomaly-machine fault code mapping table 164), the anomaly detection engine 154 may determine an association between an anomaly 166 and machine fault code 168 with a minimum (or without) human intervention. In this manner, the anomaly detection engine 154 may identify a corresponding machine fault code 168 that is associated with a detected anomaly 166. For example, assuming that the anomaly detection engine 154 detects an anomaly 166a in the ATM 120a, the anomaly detection engine 154 searches through the anomaly-machine fault code mapping table 164 and identifies that the machine fault code 168a is associated with the anomaly 166a.

Addressing an Anomaly by Performing a Countermeasure Action

Upon detecting an anomaly 166 in an ATM 120, the anomaly detection engine 154 may perform a countermeasure action 170 to address the anomaly 166. For example, the countermeasure action 170 may include triggering an alert message 172 and displaying the alert message 172 on a display screen of an ATM 120, where the alert message 172 may indicate that a machine fault code 168 is detected in the ATM 120. In another example, the countermeasure action 170 may include resetting the ATM 174. In another example, the countermeasure action 170 may include sending auto-fixing instructions 176 to the ATM 120, where the auto-fixing instructions 176 comprise updating an out-of-date firmware of one or more components 122 of the ATM 120. In another example, the countermeasure action 170 may include terminating operations of the ATM 178, i.e., isolating the ATM 120.

Detecting an Anomaly in a Second ATM Based on a Deviation Detected in the First ATM In one embodiment, the anomaly detection engine 154 may determine whether the second ATM 120b is associated with an anomaly 166 based on a deviation 180 between baseline features 144a and test features 148a detected in the first ATM 120a. For example, with respect to the first ATM 120a, assume that the anomaly detection engine 154 has detected the deviation 180 by comparing the baseline features 144a with test features 148a, and determined that the first ATM 120a is associated with an anomaly 166a, similar to that described above. Also, assume that a new and/or malicious component 190 is added (or installed adjacent) to the ATM 120a by a bad actor to exfiltrate data stored in the ATM 102a.

As described above, each component 122 is designed and fabricated in a particular manner, has particular I/O voltage signal ranges 134, and propagates particular EM radiation signals 132. The voltage signals 134 and EM radiations 132 of the new and/or malicious component 190 cause interference (e.g., voltage, current, and/or EM radiation signal interferences) against the EM radiation signals 132-2 and/or I/O voltage signals 134-2. As such, the additional new and/or malicious component 190 causes the EM radiation signals 132-2 and/or I/O voltage signals 134-2 to unexpectedly fluctuate and deviate from the EM radiation signals 132-1 and/or I/O voltage signals 134-1 indicated in the baseline features 144a. This may result in the deviation 180 between the baseline features 144a and test features 148a. The anomaly detection engine 154 determines that the deviation 180 represents the anomaly 166a, where the anomaly 166a is caused by the new and/or malicious component 190 added to an ATM 120.

With respect to the second ATM 120b, assume that the anomaly detection engine 154 has extracted baseline features 144b from signals 130b-1, and test features 148b from signals 130b-2. Also, assume that the anomaly detection engine 154 has detected the deviation 180 by comparing the baseline features 144b with test features 148b. Since, in this example, the anomaly detection engine 154 has determined that the deviation 180 associated with the anomaly 166a has been detected in the first ATM 120a, the anomaly detection engine 154 determines that the second ATM 120b is also associated with the anomaly 166a. In other words, the anomaly detection engine 154 determines that a new and/or malicious component 190 has been added to the second ATM 120b. In other examples, the anomaly detection engine 154 may determine any other anomaly 166 including those described above.

Example Method for Implementing a Server-Based Anomaly Detection System

Figure 2:
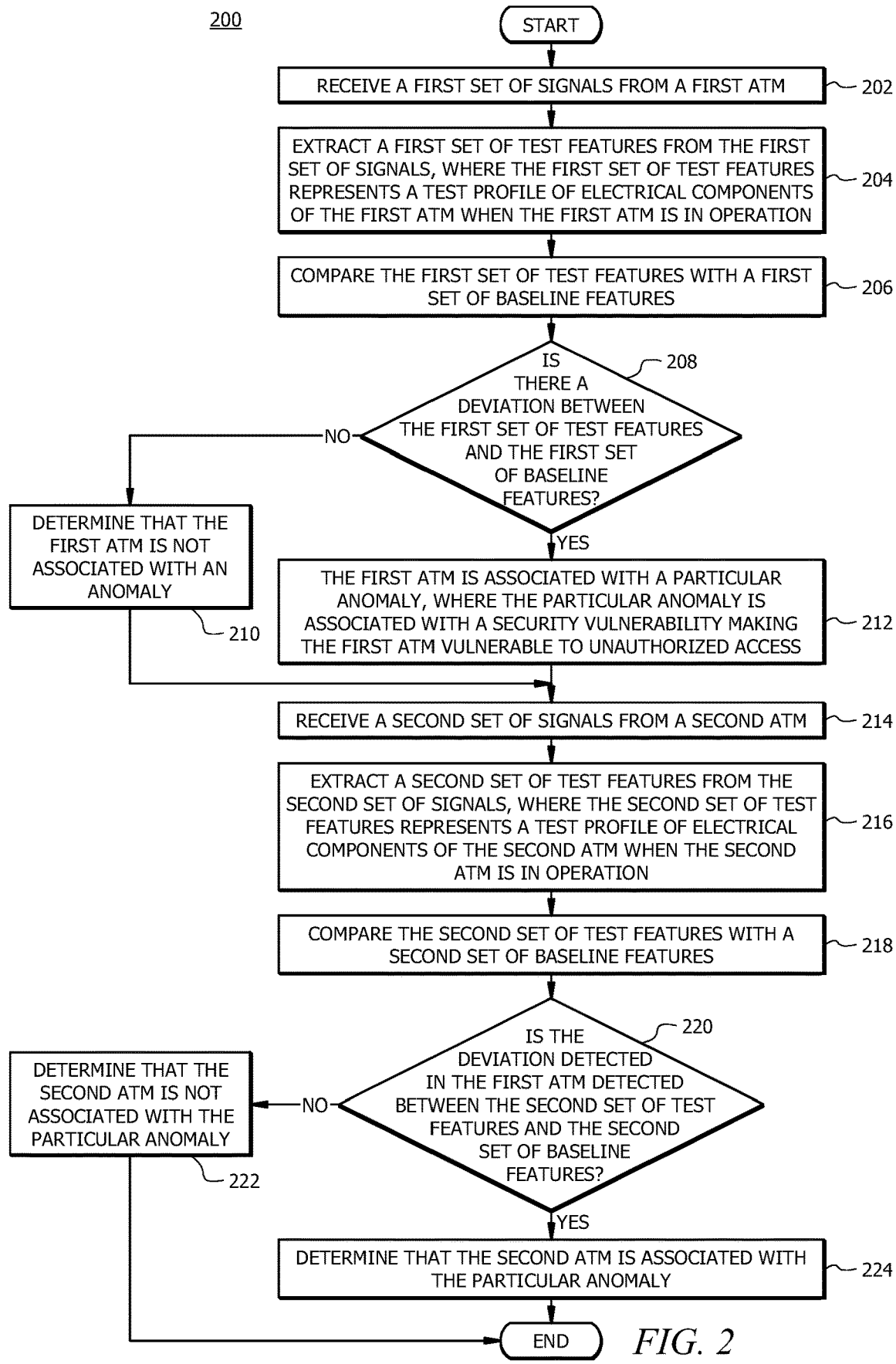
FIG. 2 illustrates an example flowchart of a method for detecting anomalies in ATMs.

FIG. 2 illustrates an example flowchart of a method 200 for detecting anomalies 166 in ATMs 120. Modifications, additions, or omissions may be made to method 200. Method 200 may include more, fewer, or other steps. For example, steps may be performed in parallel or in any suitable order. While at times discussed as the system 100, processor 152, anomaly detection engine 154, or components of any of thereof performing steps, any suitable system or components of the system may perform one or more steps of the method 200. For example, one or more steps of method 200 may be implemented, at least in part, in the form of software instructions 160 of FIG. 1, stored on non-transitory, tangible, machine-readable media (e.g., memory 158 of FIG. 1) that when run by one or more processors (e.g., processor 152 of FIG. 1) may cause the one or more processors to perform steps 202-224. To determine whether an ATM 120, such as the first ATM 120a is associated with an anomaly 166, one or more steps 202-224 of method 200 may be performed as described below.

Method 200 begins at step 202 where the anomaly detection engine 154 receives a set of signals 130a-2 from the first ATM 120a. Prior to step 202, assume that the anomaly detection engine 154 has established the first set of baseline features 144a from the set of signals 130a-1 received from the first ATM 120a, similar to that described in FIG. 1. For example, the set of signals 130a-2 may include EM radiation signals 132-2, I/O voltage signals 134-2, ATM serial number 136, and component properties 138-2. The anomaly detection engine 154 identifies the ATM 120a using the ATM serial number 136.

At step 204, the anomaly detection engine 154 extracts a first set of test features 148a from the first set of signals 130a-2. For example, the anomaly detection engine 154 may implement the machine learning algorithm 162 to extract the first set of features 148a from the set of signals 130a-2, similar to that described above in FIG. 1.

At step 206, the anomaly detection engine 154 compares the first set of test features 148a with the first set of baseline features 144a. In this process, the anomaly detection engine 154 may compare each numerical value in the baseline vector 182 with each corresponding numerical value in the test vector 184, and determine a difference between them, similar to that described in FIG. 1.

At step 208, the anomaly detection engine 154 determines whether there is a deviation 180 between the first set of test features 148a and the first set of baseline features 144a. For example, the anomaly detection engine 154 may determine that there is a deviation 180 between the first set of test features 148a and the first set of baseline features 144a, if more than a threshold percentage of the test features 148a (e.g., above 80%, 85%, etc.) are not within a threshold range (e.g., ±5%, ±10%, etc.) from their corresponding baseline features 144a, similar to that described in FIG. 1. If the anomaly detection engine 154 determines that there is the deviation 180 between the first set of test features 148a and the first set of baseline features 144a, method 200 proceeds to step 212. Otherwise, method 200 proceeds to step 210.

At step 210, the anomaly detection engine 154 determines that the first ATM 120a is not associated with an anomaly 166.

At step 212, the anomaly detection engine 154 determines that the first ATM 120a is associated with a particular anomaly 166, where the particular anomaly 166 is associated with a security vulnerability 188 that makes the first ATM 120a vulnerable to unauthorized access. Examples of anomalies 166 are described in FIG. 1. In one embodiment, the anomaly detection engine 154 may identify a particular machine fault code 168 associated with the particular anomaly 166 by searching through the anomaly-machine fault code mapping table 164, similar to that described in FIG. 1. In one embodiment, the anomaly detection engine 154 may perform a countermeasure action 170 to address the particular anomaly 166 at the first ATM 120a, similar to that described in FIG. 1.

To determine whether another ATM 120, such as the second ATM 120*b*, is associated with the particular anomaly 166 detected in the first ATM 120*a*, one or more steps 214-224 of method 200 may be performed as described below.

At step 214, the anomaly detection engine 154 receives a second set of signals 130*b*-2 from the second ATM 120*b*. Prior to step 214, assume that the anomaly detection engine 154 has established the second set of baseline features 144*b* associated with the second ATM 120, similar to that described in FIG. 1.

At step 216, the anomaly detection engine 154 extracts a second set of test features 148*b* from the second set of signals 130*b*-2, for example, by implementing the machine learning algorithm 162, similar to that described in FIG. 1.

At step 218, the anomaly detection engine 154 compares the second set of test features 148*b* with the second set of baseline features 144*b*, similar to that described in step 206 and FIG. 1.

At step 220, the anomaly detection engine 154 determines whether the deviation 180 detected in the first ATM 120*a* is detected between the second set of test features 148*b* and the second set of baseline features 144*b*. For example, assume that the deviation 180 detected in the first ATM 120*a* is caused by adding a malicious component 190 to the first ATM 120*a*. Adding the malicious component 190 to the first ATM 120*a* causes interference on the EM radiation signals 132 and/or I/O voltage signals 134 of the components 122. This interference causes the EM radiation signals 132 and/or I/O voltage signals 134 to fluctuate in a particular manner. The malicious component 190 operates with particular I/O voltage signal ranges 134 and propagates particular EM radiation signals 132. Thus, the interference from the malicious component 190 and its particular I/O voltage signal ranges 134 and particular EM radiation signals 132 lead to the deviation 180 between the first set of test features 148*a* and the first set of baseline features 144*a*. If the malicious component 190 is added to the second ATM 120*b*, the particular I/O voltage signal ranges 134 and particular EM radiation signals 132 of the malicious component 190 are detected in the second set of test features 148*b*. This causes the deviation 180 between the second set of test features 148*b* and the second set of baseline features 144*b*. If the anomaly detection engine 154 detects the deviation 180 between the second set of test features 148*b* and the second set of baseline features 144*b*, method 200 proceeds to step 224. Otherwise, method 200 proceeds to step 222.

At step 222, the anomaly detection engine 154 determines that the second ATM 120*b* is not associated with the particular anomaly 166.

At step 224, the anomaly detection engine 154 determines that the second ATM 120*b* is associated with the particular anomaly 166. In one embodiment, the anomaly detection engine 154 may perform a countermeasure action 170 to address the particular anomaly 166 at the second ATM 120*b*, similar to that described above with respect to the first ATM 120*a*.

Example Anomaly and Security Threat Detection System

Figure 3:
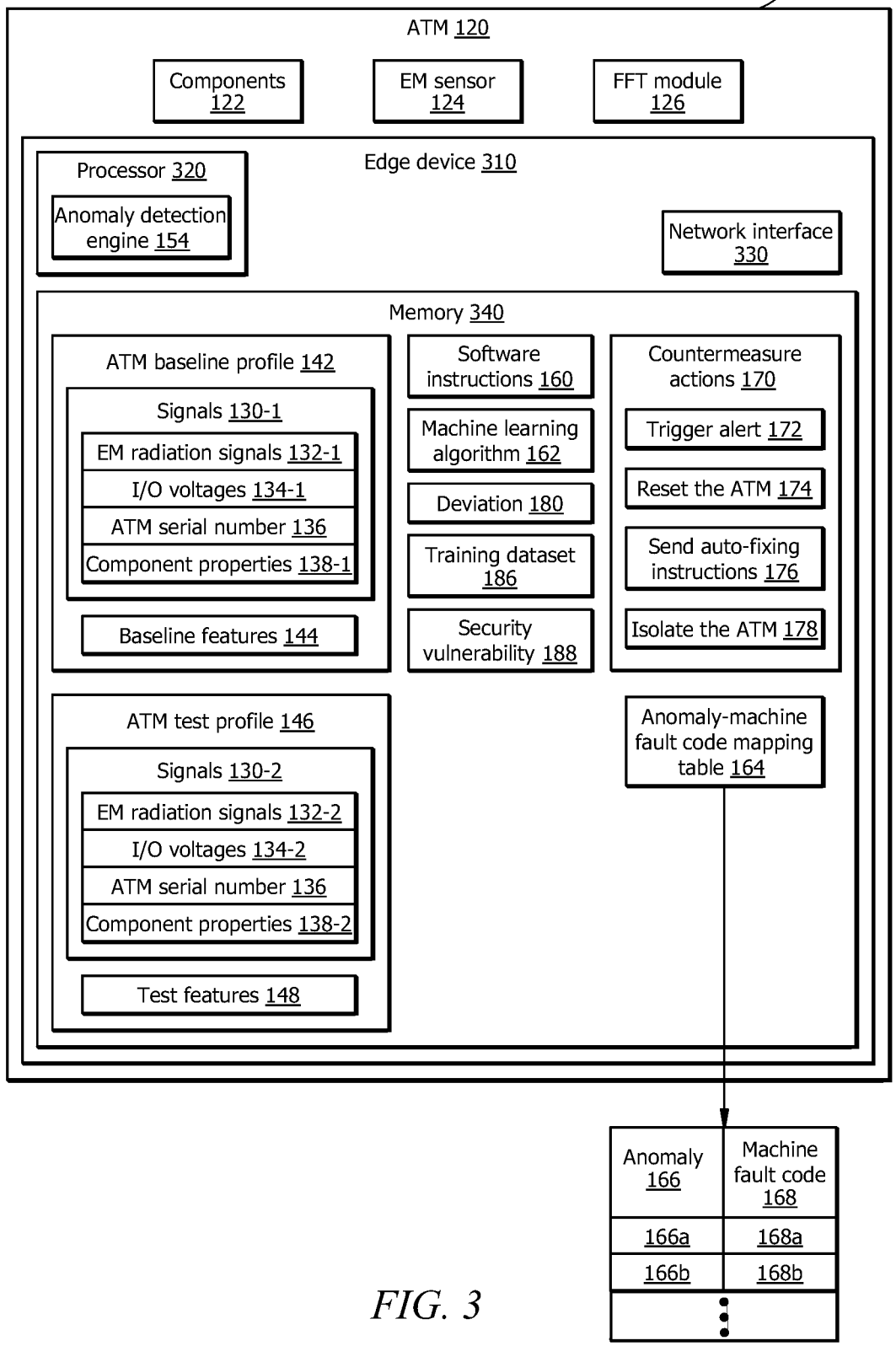
FIG. 3 illustrates an embodiment of a system configured to detect anomalies in an ATM, and a computing device.

FIG. 3 illustrates one embodiment of an ATM-based anomaly detection system 300. In one embodiment, system 300 comprises an ATM 120. In one embodiment, the anomaly detection process described in FIG. 1 may be implemented by the ATM 120. To this end, the anomaly detection engine 154 may be executed by a processor 320 associated with the ATM 120. In the illustrated embodiment, the ATM 120 comprises components 122, EM sensors 124, FFT module 126, and edge device 310. The edge device 310 comprises the processor 320 in signal communication with a memory 230. Memory 230 stores software instructions 160 that when executed by the processor 320 cause the processor 320 to perform one or more functions described herein. For example, when the software instructions 160 are executed, the processor 320 executes the anomaly detection engine 154 to detect anomalies 166 in the ATM 120. In other embodiments, system 300 may not have all of the components listed and/or may have other elements instead of, or in addition to, those listed above.

In general, system 300 (via the anomaly detection engine 154) receives a first set of signals 130*a*-1 from the components 122 associated with the ATM 120 when the ATM 120 is installed or initiated to operate. The anomaly detection engine 154 extracts baseline features 144 from the first set of signals 130-1, where the baseline features 144 represent an initial and unique electrical signature of the component 122 of the ATM 120. The anomaly detection engine 154 receives a second set of signals 130-2 from the components 122 while the ATM 120 is in operation. The anomaly detection engine 154 extracts test features 148 from the second set of signals 130-2. The anomaly detection engine 154 determines whether there is a deviation 180 between the test features 148 and baseline features 144. If the anomaly detection engine 154 determines that there is a deviation 180 between the test features 148 and baseline features 144, the anomaly detection engine 154 determines that the ATM 120 is associated with a particular anomaly 166, where the particular anomaly 166 is associated with a security vulnerability that makes the ATM 120 vulnerable to unauthorized access.

System Components

Certain components of system 300 are described in FIG. 1, such as the ATM 120. Additional components are described below.

Edge Device

Edge device 310 is generally a software and/or hardware module. For example, the edge device 310 may be implemented in one or more microprocessors, circuit boards, and the like. The edge device 310 is generally configured to oversee the anomaly detection process performed by the processor 320 described below.

Processor 320 comprises one or more processors operably coupled to the memory 340. The processor 320 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 320 may be a programmable logic device, a microcontroller, a microprocessor, or any suitable combination of the preceding. The one or more processors are configured to process data and may be implemented in hardware or software. For example, the processor 320 may be 8-bit, 16-bit, 32-bit, 64-bit, or of any other suitable architecture. The processor 320 may include an arithmetic logic unit (ALU) for performing arithmetic and logic operations, processor 320 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 160) to implement the anomaly detection engine 154. In this way, processor 320 may be a special-purpose computer designed to implement the functions disclosed herein. In an embodiment, the processor 320 is implemented using logic units, FPGAs, ASICs, DSPs, or any other suitable hardware. The processor 320 is configured to operate as described in FIGS. 3-5. For example, the processor 320 may be configured to perform one or more steps of methods 400 and 500 as described in FIGS. 4 and 5, respectively.

Network interface 330 is configured to enable wired and/or wireless communications (e.g., via network 110). The network interface 330 is configured to communicate data between the ATMs 120, databases (e.g., ATM profile database 140 of FIG. 1), servers (e.g., server 150 of FIG. 1), systems, and domains. For example, the network interface 330 may comprise a WIFI interface, a local area network (LAN) interface, a wide area network (WAN) interface, a modem, a switch, or a router. The processor 320 is configured to send and receive data using the network interface 330. The network interface 330 may be configured to use any suitable type of communication protocol as would be appreciated by one of ordinary skill in the art.

Memory 340 may be volatile or non-volatile and may comprise a read-only memory (ROM), random-access memory (RAM), ternary content-addressable memory (TCAM), dynamic random-access memory (DRAM), and static random-access memory (SRAM). Memory 340 may be implemented using one or more disks, tape drives, solid-state drives, and/or the like. Memory 340 is operable to store the ATM baseline profile 142, ATM test profile 146, software instructions 160, machine learning algorithm 162, anomaly-machine fault code mapping table 164, countermeasure actions 170, deviation 180, training dataset 186, security vulnerability 188, and/or any other data or instructions. The software instructions 160 may comprise any suitable set of instructions, logic, rules, or code operable to execute the processor 320.

In one embodiment, the edge device 310 and/or anomaly detection engine 154 may be implemented in a computing device 350, such as a personal computer, a desktop computer, a workstation, a server, a laptop, a tablet computer, a mobile phone (such as a smartphone), an ATM 120, etc.

Example Method for Implementing an ATM-Based Anomaly Detection System

Figure 4:
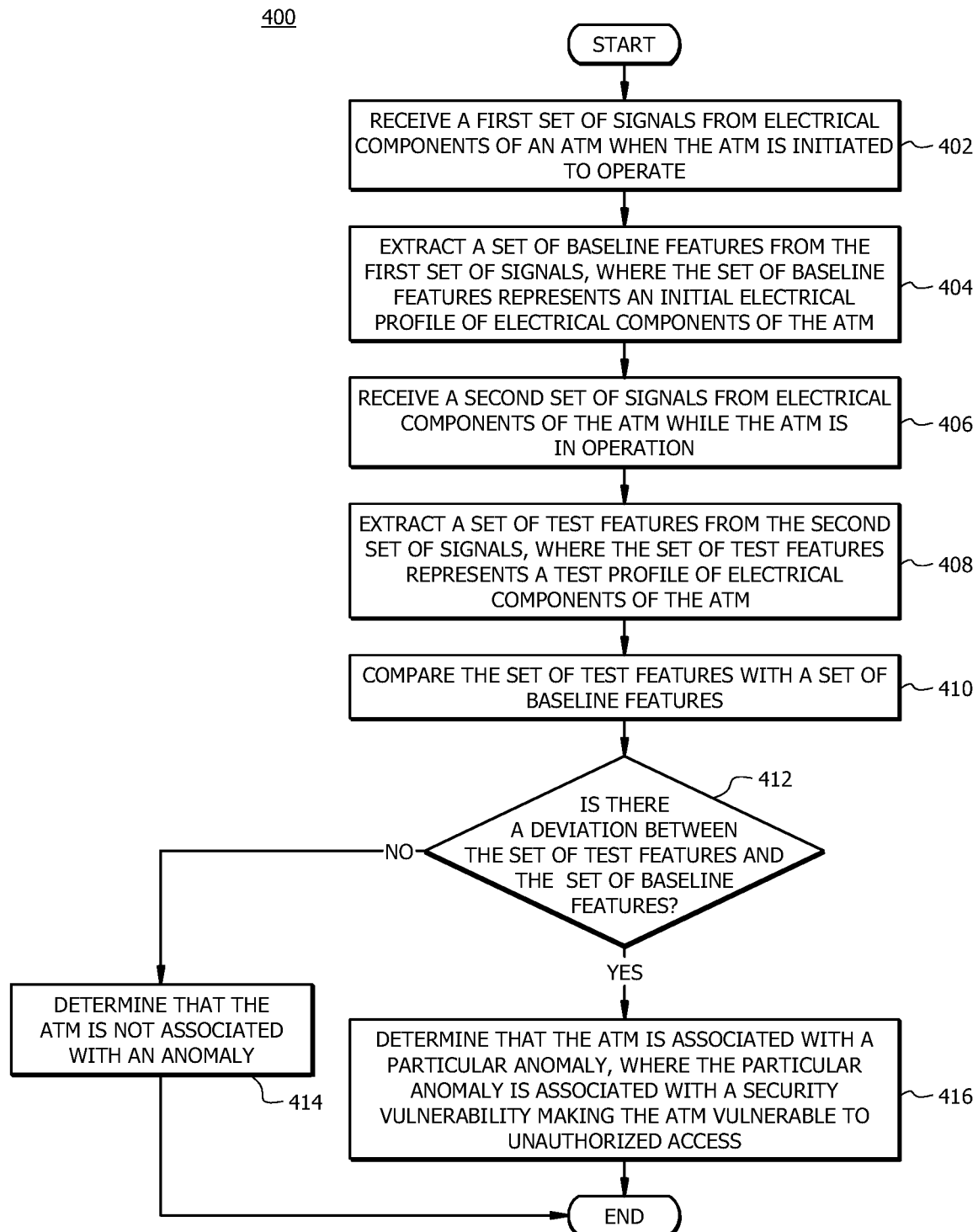
FIG. 4 illustrates an example flowchart of a method for detecting anomalies in an ATM.

FIG. 4 illustrates an example flowchart of a method 400 for detecting anomalies 166 in an ATM 120. Modifications, additions, or omissions may be made to method 400. Method 400 may include more, fewer, or other steps. For example, steps may be performed in parallel or in any suitable order. While at times discussed as the system 300, processor 320, anomaly detection engine 154, or components of any of thereof performing steps, any suitable system or components of the system may perform one or more steps of the method 400. For example, one or more steps of method 400 may be implemented, at least in part, in the form of software instructions 160 of FIG. 3, stored on non-transitory, tangible, machine-readable media (e.g., memory 340 of FIG. 3) that when run by one or more processors (e.g., processor 320 of FIG. 3) may cause the one or more processors to perform steps 402-416.

Method 400 begins at step 402 where the anomaly detection engine 154 receives a set of signals 130-1 from the electrical components 122 of the ATM 120 when the ATM 120 is initiated to operate. For example, the first set of signals 130-1 may include EM radiation signals 132-1, I/O voltage signals 134-1, ATM serial number 136, and component properties 138-1.

At step 404, the anomaly detection engine 154 extracts a set of baseline features 144 from the first set of signals 130-1, where the set of baseline features 144 represents an initial electrical profile or baseline profile 142 of the components 122 of the ATM 120. For example, the anomaly detection engine 154 feeds the first set of signals 130-1 to the machine learning algorithm 162 to extract the set of baseline features 144, similar to that described in FIG. 1.

At step 406, the anomaly detection engine 154 receives a second set of signals 130-2 from the electrical components 122 of the ATM 120 while the ATM 120 is in operation. For example, the anomaly detection engine 154 may receive the second set of signals 130-2 when a user operates the ATM 120 to perform a transaction. In another example, the anomaly detection engine 154 may receive the second set of signals 130-2 continuously or periodically, e.g., every minute, every few minutes, every hour, or any other suitable interval. In another example, the anomaly detection engine 154 may be triggered to receive the set of signals 130-2 when a camera of the ATM 120 captures a user approaching the ATM 120. The anomaly detection engine 154 extracts test features 148 from the second set of signals 130-2, e.g., by implementing the machine learning algorithm 162 similar to that described in FIG. 1.

At step 408, the anomaly detection engine 154 extracts a set of test features 148 from the second set of signals 130-2, where the set of test features 148 represents a test profile 146 of the electrical components 122 of the ATM 120, similar to that described in step 404 and FIG. 1.

At step 410, the anomaly detection engine 154 compares the set of test features 148 with the set of baseline features 144, similar to that described in step 206 of method 200 in FIG. 2 and FIG. 1.

At step 412, the anomaly detection engine 154 determines whether there is a deviation 180 between the set of test features 148 and the set of baseline features 144. For example, the anomaly detection engine 154 may detect the deviation 180 between the set of test features 148 and the set of baseline features 144 if more than a threshold percentage (e.g., more than 80%, 85%, or any suitable percentage) of the test features 148 deviate more than a threshold range (e.g., ±5%, ±10%, etc.) from their corresponding baseline features 144. If the anomaly detection engine 154 detects the deviation 180 between the set of test features 148 and the set of baseline features 144, method 400 proceeds to step 416. Otherwise, method 400 proceeds to step 414.

At step 414, the anomaly detection engine 154 determines that the ATM 120 is not associated with an anomaly 166.

At step 416, the anomaly detection engine 154 determines that the ATM 120 is associated with a particular anomaly 166, where the particular anomaly is associated with a security vulnerability 188 that makes the ATM 120 vulnerable to unauthorized access. In one embodiment, the anomaly detection engine 154 may perform a countermeasure action 170 to address the particular anomaly 166 at the ATM 120, similar to that described in FIG. 1.

As described above, the edge device 310 and/or anomaly detection engine 154 may be implemented in the computing device 350. The corresponding description below described a method 500 for detecting anomalies in the computing device 350.

Example Method for Implementing an Anomaly Detection in a Computing Device

Figure 5:
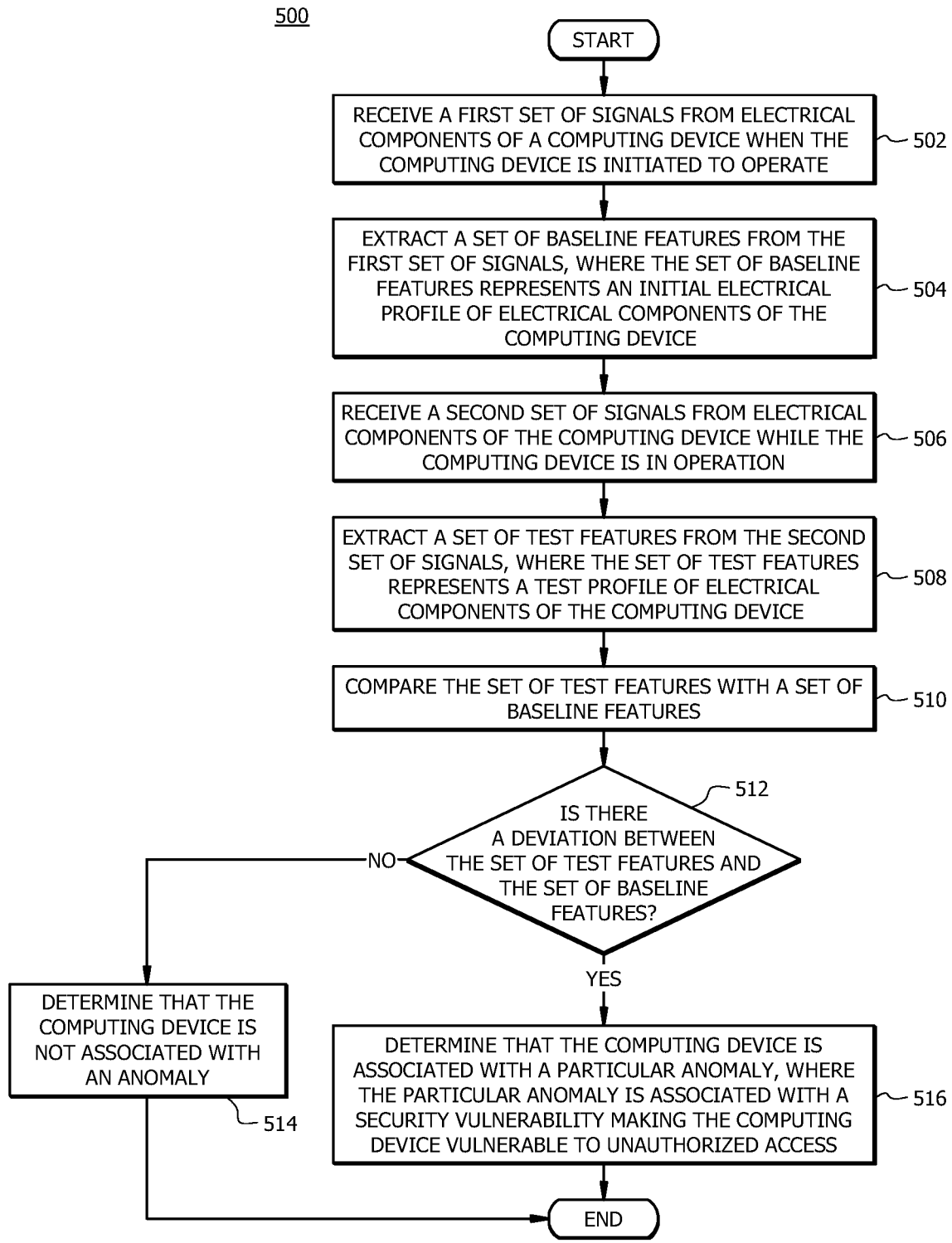
FIG. 5 illustrates an example flowchart of a method for detecting anomalies in a computing device.

FIG. 5 illustrates an example flowchart of a method 500 for detecting anomalies 166 in a computing device 350. Modifications, additions, or omissions may be made to method 500. Method 500 may include more, fewer, or other steps. For example, steps may be performed in parallel or in any suitable order. While at times discussed as the system 300, processor 320, anomaly detection engine 154, or components of any of thereof performing steps, any suitable system or components of the system may perform one or more steps of the method 500. For example, one or more steps of method 500 may be implemented, at least in part, in the form of software instructions 160 of FIG. 3, stored on non-transitory, tangible, machine-readable media (e.g., memory 340 of FIG. 3) that when run by one or more processors (e.g., processor 320 of FIG. 3) may cause the one or more processors to perform steps 502-516.

Method 500 begins at step 502 where the anomaly detection engine 154 receives a first set of signals 130-1 from the electrical components 122 of the computing device 350 when the computing device 350 is initiated to operate. For example, the first set of signals 130-1 may include EM radiation signals 132-1, I/O voltage signals 134-1, computing device serial number 136, and component properties 138-1. For example, the computing device 350 may be as a personal computer, a desktop computer, a workstation, a server, a laptop, a tablet computer, a mobile phone (such as a smartphone), an ATM 120, etc.

At step 504, the anomaly detection engine 154 extracts a set of baseline features 144 from the first set of signals 130-1, where the set of baseline features 144 represents an initial electrical profile or baseline profile 142 of the components 122 of the computing device 350. For example, the anomaly detection engine 154 feeds the first set of signals 130-1 to the machine learning algorithm 162 to extract the set of baseline features 144, similar to that described in FIG. 1.

At step 506, the anomaly detection engine 154 receives a second set of signals 130-2 from the electrical components 122 of the computing device 350 while the computing device 350 is in operation. For example, the anomaly detection engine 154 may receive the second set of signals 130-2 when a user operates the computing device 350 to perform a task, e.g., send an email, browse a website, operates a software application, or any task that a user can perform on the computing device 350. In another example, the anomaly detection engine 154 may receive the second set of signals 130-2 when the computing device 350 boots up or starts to operate after a shut down. In another example, the anomaly detection engine 154 may receive the second set of signals 130-2 continuously or periodically, e.g., every minute, every few minutes, every hour, or any other suitable interval. The anomaly detection engine 154 extracts test features 148 from the second set of signals 130-2, e.g., by implementing the machine learning algorithm 162 similar to that described in FIG. 1.

At step 508, the anomaly detection engine 154 extracts a set of test features 148 from the second set of signals 130-2, where the set of test features 148 represents a test profile 146 of the electrical components 122 of the computing device 350, similar to that described in step 204 of method 200 in FIG. 2 and FIG. 1.

At step 510, the anomaly detection engine 154 compares the set of test features 148 with the set of baseline features 144, similar to that described in step 206 of method 200 in FIG. 2 and FIG. 1.

At step 512, the anomaly detection engine 154 determines whether there is a deviation 180 between the set of test features 148 and the set of baseline features 144. For example, the anomaly detection engine 154 may detect the deviation 180 between the set of test features 148 and the set of baseline features 144 if more than a threshold percentage (e.g., more than 80%, 85%, or any suitable percentage) of the test features 148 deviate more than a threshold range (e.g., ±5%, ±10%, etc.) from their corresponding baseline features 144. If the anomaly detection engine 154 detects the deviation 180 between the set of test features 148 and the set of baseline features 144, method 500 proceeds to step 516. Otherwise, method 500 proceeds to step 514.

At step 514, the anomaly detection engine 154 determines that the computing device 350 is not associated with an anomaly 166.

At step 516, the anomaly detection engine 154 determines that the computing device 350 is associated with a particular anomaly 166, where the particular anomaly is associated with a security vulnerability 188 that makes the computing device 350 vulnerable to unauthorized access. In one embodiment, the anomaly detection engine 154 may perform a countermeasure action 170 to address the particular anomaly 166 at the computing device 350, similar to that described in FIG. 1.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for detecting security threats in Automated Teller Machines (ATMs), comprising:
   a memory operable to store a set of baseline features associated with an ATM device, wherein:
   the set of baseline features represents a unique electrical signature associated with a plurality of electrical components of the ATM device when the ATM device is initiated to operate; and
   the set of baseline features comprises at least one of expected electrical signal patterns communicated between the plurality of electrical components, expected electromagnetic radiation patterns propagated from the plurality of electrical components, and a verified component serial number associated with each electrical component of the plurality of electrical components of the ATM device; and
   a processor, operably coupled with the memory, configured to:
   receive a first set of signals from the plurality of electrical components of the ATM device while the ATM device is in operation, wherein the first set of signals comprises intercommunication signals between the plurality of electrical components, electrical signal patterns communicated between the plurality of electrical components, electromagnetic radiation patterns propagated from the plurality of electrical components, and a component serial number associated with each of the plurality of electrical components of the ATM device;

extract a set of test features from the first set of signals, wherein the set of test features represents a test profile of the plurality of electrical components of the ATM device while the ATM device is in operation;

compare the set of test features with the set of baseline features;

determine whether there is a deviation between the set of test features and the set of baseline features, wherein determining whether there is the deviation between the set of test features and the set of baseline features comprises:

determine that the component serial number corresponding to a particular electrical component of the plurality of electrical components in the set of test features is different from any of the verified component serial numbers in the set of baseline features;

identify the particular electrical component as an unverified electrical component in the ATM device based on determining that the component serial number corresponding to the particular electrical component in the set of test features is different from any of the verified component serial numbers in the set of baseline features;

detect fluctuations in the electrical signal patterns and the electromagnetic radiation patterns in the set of test features associated with the unverified electrical component with respect to the expected electrical signal patterns and the expected electromagnetic signal patterns in the set of baseline features; and determine that more than a threshold percentage of test features from the set of test features are not within a threshold range from corresponding baseline features from the set of baseline features caused by the unverified electrical component; and in response to determining the deviation between the set of test features and the set of baseline features, determine that the ATM device is associated with a particular anomaly, wherein the particular anomaly corresponds to a security vulnerability making the ATM device vulnerable to unauthorized access.

2. The system of claim 1, further configured for detecting security threats in at least one of a desktop computer, a laptop, a server, and a mobile phone.

3. The system of claim 1, wherein the processor is further configured to perform a countermeasure action to address the particular anomaly.

4. The system of claim 3, wherein the countermeasure action comprises at least one of:
displaying a notifying message on the ATM device that the particular anomaly is detected in the ATM device;
resetting the ATM device;
sending auto-fixing instructions to the ATM device, wherein the auto-fixing instructions comprise updating a firmware version installed in the ATM device; and
terminating operations of the ATM device.

5. The system of claim 1, wherein the set of baseline features comprises at least one of:
features indicating electromagnetic signal radiations propagated from the plurality of electrical components of the ATM device;
features indicating input and output voltages of the plurality of electrical components of the ATM device; and
features indicating a serial number uniquely identifying the ATM device.

6. The system of claim 1, wherein the processor is further configured to update the set of baseline features based at least in part upon one or more changes made to any of the plurality of electrical components of the ATM device in an updating process by authorized personnel.

7. The system of claim 1, wherein the particular anomaly comprises at least one of data leakage from the memory, signal fluctuations in an electrical component from the plurality of electrical components of the ATM device, a tampered existing electrical component, and a new component added to the plurality of electrical components of the ATM device.

8. A method for detecting security threats in Automated Teller Machines (ATMs), comprising:
receiving a first set of signals from a plurality of electrical components of an ATM device while the ATM device is in operation, wherein the first set of signals comprises at least one of electrical signal patterns communicated between the plurality of electrical components, electromagnetic radiation patterns propagated from the plurality of electrical components, and a component serial number associated with each of the plurality of electrical components of the ATM device;

extracting a set of test features from the first set of signals, wherein the set of test features represents a test profile of the plurality of electrical components of the ATM device while the ATM device is in operation;

comparing the set of test features with a set of baseline features, wherein the set of baseline features represents a unique electrical signature associated with the plurality of electrical components of the ATM device when the ATM device is initiated to operate, and the set of baseline features comprises at least one of expected electrical signal patterns communicated between the plurality of electrical components, expected electromagnetic radiation patterns propagated from the plurality of electrical components, and a verified component serial number associated with each electrical component of the plurality of electrical components of the ATM device when the ATM device is initiated to operate;

determining whether there is a deviation between the set of test features and the set of baseline features, wherein determining whether there is the deviation between the set of test features and the set of baseline features comprises:

determining that the component serial number corresponding to a particular electrical component of the plurality of electrical components in the set of test features is different from any of the verified component serial numbers in the set of baseline features;

identifying the particular electrical component as an unverified electrical component in the ATM device based on determining that the component serial number corresponding to the particular electrical component in the set of test features is different from any of the verified component serial numbers in the set of baseline features;

detecting fluctuations in the electrical signal patterns and the electromagnetic radiation patterns in the set of test features associated with the unverified electrical component with respect to the expected electrical signal patterns and the expected electromagnetic signal patterns in the set of baseline features; and determining that more than a threshold percentage of test features from the set of test features are not within a threshold range from corresponding baseline features from the set of baseline features caused by the unverified electrical component; and in response to determining the deviation between the set of test features and the set of baseline features, determining that the ATM device is associated with a particular anomaly, wherein the particular anomaly corresponds to a security vulnerability making the ATM device vulnerable to unauthorized access.

9. The method of claim 8, further comprising detecting security threats in at least one of a desktop computer, a laptop, a server, and a mobile phone.

10. The method of claim 8, further comprising performing a countermeasure action to address the particular anomaly.

11. The method of claim 10, wherein the countermeasure action comprises at least one of:

displaying a notifying message on the ATM device that the particular anomaly is detected in the ATM device;

resetting the ATM device;

sending auto-fixing instructions to the ATM device, wherein the auto-fixing instructions comprise updating a firmware version installed in the ATM device; and terminating operations of the ATM device.

12. The method of claim 8, wherein the set of baseline features comprises at least one of:

features indicating electromagnetic signal radiations propagated from the plurality of electrical components of the ATM device;

features indicating input and output voltages of the plurality of electrical components of the ATM device; and features indicating a serial number uniquely identifying the ATM device.

13. The method of claim 8, further comprising updating the set of baseline features based at least in part upon one or more changes made to the any of the plurality of electrical components of the ATM device in an updating process by authorized personnel.

14. The method of claim 8, wherein the particular anomaly comprises at least one of data leakage from a memory of the ATM device, signal fluctuations in an electrical component from the plurality of electrical components of the ATM device, a tampered existing electrical component, and a new component added to the plurality of electrical components of the ATM device.

15. A non-transitory computer-readable medium storing instructions that, when executed by a processor, cause the processor to:

receive a first set of signals from a plurality of electrical components of an ATM device while the ATM device is in operation, wherein the first set of signals comprises at least one of electrical signal patterns communicated between the plurality of electrical components, electromagnetic radiation patterns propagated from the plurality of electrical components, and a component serial number associated with each of the plurality of electrical components of the ATM device;

extract a set of test features from the first set of signals, wherein the set of test features represents a test profile of the plurality of electrical components of the ATM device while the ATM device is in operation;

compare the set of test features with a set of baseline features, wherein the set of baseline features represents a unique electrical signature of associated with the plurality of electrical components of the ATM device when the ATM device is initiated to operate, and the set of baseline features comprises at least one of expected electrical signal patterns communicated between the plurality of electrical components, expected electromagnetic radiation patterns propagated from the plurality of electrical components, and a verified component serial number associated with each electrical component of the plurality of electrical components of the ATM device when the ATM device is initiated to operate;

determine whether there is a deviation between the set of test features and the set of baseline features, wherein determining whether there is the deviation between the set of test features and the set of baseline features comprises:

determine that the component serial number corresponding to a particular electrical component of the plurality of electrical components in the set of test features is different from any of the verified component serial numbers in the set of baseline features;

identify the particular electrical component as an unverified electrical component in the ATM device based on determining that the component serial number corresponding to the particular electrical component in the set of test features is different from any of the verified component serial numbers in the set of baseline features;

detect fluctuations in the electrical signal patterns and the electromagnetic radiation patterns in the set of test features associated with the unverified electrical component with respect to the expected electrical signal patterns and the expected electromagnetic signal patterns in the set of baseline features; and determine that more than a threshold percentage of test features from the set of test features are not within a threshold range from corresponding baseline features from the set of baseline features caused by the unverified electrical component; and in response to determining the deviation between the set of test features and the set of baseline features, determine that the ATM device is associated with a particular anomaly, wherein: the particular anomaly corresponds to a security vulnerability making the ATM device vulnerable to unauthorized access.

16. The computer-readable medium of claim 15, wherein the instructions when executed by the processor, further cause the processor to perform detecting security threats in at least one of a desktop computer, a laptop, a server, and a mobile phone.

17. The computer-readable medium of claim 15, wherein the instructions when executed by the processor, further cause the processor to perform a countermeasure action to address the particular anomaly.

18. The computer-readable medium of claim 17, wherein the countermeasure action comprises at least one of:

displaying a notifying message on the ATM device that the particular anomaly is detected in the ATM device;

resetting the ATM device;

sending auto-fixing instructions to the ATM device, wherein the auto-fixing instructions comprise updating a firmware version installed in the ATM device; and terminating operations of the ATM device.

19. The computer-readable medium of claim 15, wherein the set of baseline features comprises at least one of:

features indicating electromagnetic signal radiations propagated from the plurality of electrical components of the ATM device;

features indicating input and output voltages of the plurality of electrical components of the ATM device; and features indicating a serial number uniquely identifying the ATM device.

20. The computer-readable medium of claim 15, wherein the particular anomaly comprises at least one of data leakage from a memory of the ATM device, signal fluctuations in an electrical component from the plurality of electrical components of the ATM device, a tampered existing electrical component, and a new component added to the plurality of electrical components of the ATM device.

* * * * *